(12) United States Patent
Gedge et al.

(10) Patent No.: US 6,792,844 B1
(45) Date of Patent: Sep. 21, 2004

(54) HYDRAULIC SYSTEM FOR AIRCRAFT LANDING GEAR

(75) Inventors: Colin Robert Gedge, Poole (GB); Andrew Bramwell, Crewkerne (GB)

(73) Assignee: Honeywell Normalair-Garrett (Holdings) Limited, Yeovil (GB)

( * ) Notice: Subject to any disclaimer, the term of this patent is extended or adjusted under 35 U.S.C. 154(b) by 0 days.

(21) Appl. No.: 10/089,947
(22) PCT Filed: Jul. 25, 2000
(86) PCT No.: PCT/GB00/02853
  § 371 (c)(1),
  (2), (4) Date: Jul. 23, 2002
(87) PCT Pub. No.: WO01/25087
  PCT Pub. Date: Apr. 12, 2001

(30) Foreign Application Priority Data

Oct. 7, 1999 (GB) .............................. 9923620

(51) Int. Cl.$^7$ ............................ B64C 25/22; F15B 11/24
(52) U.S. Cl. ........................... 91/436; 60/461; 251/63.4
(58) Field of Search .................. 91/436, 451; 60/461, 60/468, 904; 244/102 R; 251/63.4, 83

(56) References Cited

U.S. PATENT DOCUMENTS

| | | | |
|---|---|---|---|
| 2,267,284 A | 12/1941 | Livers | 91/436 |
| 2,367,682 A | 1/1945 | Kehle | 91/436 |
| 2,646,025 A | 7/1953 | Deardorff | 91/436 |
| 3,438,307 A | 4/1969 | Ahlenius | 91/436 |
| 4,336,826 A | 6/1982 | Grawunde | |
| 4,723,476 A | * 2/1988 | Stucky | 91/436 |

FOREIGN PATENT DOCUMENTS

| | | | |
|---|---|---|---|
| EP | 0 394612 | 10/1990 | |
| FR | 2734608 | 11/1996 | |
| FR | 2734608 A1 | * 11/1996 | F15B/11/08 |
| JP | 11 257304 | 9/1999 | |

* cited by examiner

Primary Examiner—Thomas E. Lazo
(74) Attorney, Agent, or Firm—Marshall, Gerstein & Borun LLP

(57) ABSTRACT

A hydraulic system for raising and lowering aircraft landing gear (11, 12) includes an actuator (18) which is extendible and retractable to operate the landing gear, the actuator (18) including a movable member (19) in a casing (20), the movable member (19) being moved relative to the casing (20) in a first direction to extend the actuator (18) when fluid under pressure is supplied to a first side (22) of the movable member (19) while fluid is exhausted from a second side (23) of the movable member (19), and the movable member (19) being moved in a second direction to retract the actuator (18) when fluid under pressure is supplied to the second side (23) of the movable member (19) while fluid is exhausted from the first side (22) of the movable member (19), and there being selector valve (25) selectively to supply pressurized fluid to the first (22) or second (23) side of the movable member (19), and a check valve (40) to permit exhausted fluid from at least one of the first (22) and second (23) sides of the movable member (19) to augment the supplied fluid from the selector valve (25) and thus be directed with the supplied fluid, to the second (23) or first side (22) respectively of the movable member (19).

15 Claims, 3 Drawing Sheets

FIG_2

HYDRAULIC SYSTEM FOR AIRCRAFT LANDING GEAR

FIELD OF THE INVENTION

This invention relates to a hydraulic system for raising and lowering an aircraft landing gear, and more particularly but not exclusively useful for a kind of aircraft landing gear known as a side brace, where the landing gear is movable between a generally vertical condition for landing, and a generally horizontal condition for stowage e.g. within a wing of the aircraft.

BACKGROUND OF THE INVENTION

A particular feature of such side brace landing gears is that landing loads act through an actuator which is provided to raise and lower the landing gear. Accordingly such actuators have to be more substantial than would be required simply for raising and lowering the landing gear. Typically such actuators are piston and cylinder arrangements, and the piston diameter is made larger than is necessary just for raising and lowering the landing gear.

SUMMARY OF THE INVENTION

As a result, th actuator demands a large volume of hydraulic fluid for operation. Particularly during landing, when it is desired to lower the landing gear, other aircraft services will be demanding hydraulic fluid, for example flap lowering actuators may require fluid, which can place high demands on the hydraulic pump(s) supplying pressurised hydraulic fluid to the various services.

According to one aspect of the invention we provide a hydraulic system for raising and lowering aircraft landing gear, the system including an actuator which is extendible and retractable to operate the landing gear, the actuator including a movable member in a casing, the movable member being moved relative to the casing in a first direction to extend the actuator when fluid under pressure is supplied to a first side of the movable member while fluid is exhausted from a second side of the movable member, and the movable member being moved in a second direction to retract the actuator when fluid under pressure is supplied to the second side of the movable member while fluid is exhausted from the first side of the movable member, and there being selector valve means selectively to supply pressurized fluid to the first or second side of the movable member, and means provided to permit exhausted fluid from at least one of the first and second sides of the movable member to augment the supplied fluid from the selector valve means and thus be directed with the supplied fluid, to the second or first side respectively of the movable member.

By virtue of the system of the present invention, the demand on the hydraulic pump(s) is thus reduced during landing gear operation as exhausted fluid is recirculated to augment the fluid supply, thus reducing the volume of fluid required from the hydraulic pump(s) to operate the landing gear.

In one arrangement the means which permit exhausted fluid to augment the supplied fluid includes a check valve which is opened as tile movable member of the actuator moves relatively in the casing in the first direction to extend the actuator and lower the landing gear.

The check valve mast be adapted to open to permit exhausted fluid from the second side of the movable member to augment the supplied fluid in response to the pressure of the fluid supplied to the first side of the member or alternatively in response to a pressure build up in a line carrying exhausted fluid from the second side of the movable member. In each case preferably closure means are provided positively to close the check valve when pressurised fluid is supplied by the selector salve to the second side of the movable member.

Such closure means may be of a hydraulic and/or mechanical nature.

Preferably means are provided to relieve exhausted fluid which is not recirculated from the at least one of the first and second sides of the movable member as the movable member reaches tile end of travel in the casing. Thus there is no risk of trapped fluid interfering Faith the propel operation of the landing gear.

In one arrangement the hydraulic system includes a first fluid supply line to the first side of the movable member for supplied fluid from the selector valve means when the selector valve means is in a first position, and a second supply line to the second side of the movable member for supplied fluid from the selector valve means when the selector valve means is in a second position, and the means which permit exhausted fluid from at least one of the first and second sides of the movable member to augment the supplied fluid from the selector valve means and thus be directed with the supplied fluid, to the second or first side respectively of the movable member, permitting the exhausted fluid to flow from the second supply line to the first supply line.

To ensure that exhausted fluid is available to augment the supplied fluid to extend the actuator, the second supply line may include non-return means at least to restrict the flow of exhausted fluid from the hydraulic system. However desirably a restrictor means is provided to enable a restricted flow of exhausted fluid to by-pass the non-return means so that fluid which is not recirculated, is not trapped in the second supply line which could interfere with the proper operation of the landing gear.

The selector valve means may be movable to a first position to permit the flow of fluid therethrough from a source of pressurized fluid to the first side of the movable member, and to a second position to permit the flow of fluid therethrough from the source to the second side of the movable member, and to a rest position in which the source is isolated and fluid may pass from the system tank.

According to a second aspect of the invention we provide an aircraft having landing gear which is raised and lowered by a hydraulic system according to the first aspect of the invention.

According to a third aspect of the invention we provide a valve including, a valve member and a piston each received in a passage in a valve body, the valve member and piston being biased apart by resilient means such that the valve member is urged towards a valve seat towards one end of the passage, and the piston is urged towards a stop towards an opposite end of the passage, a fluid inlet and a fluid outlet, the pressure of fluid at the inlet when sufficient, acting to move tile valve member against the force of the biasing means off the valve seat to permit fluid flow from the inlet, past the valve seat, to the outlet, and the piston being movable in the passage away from the stop in response to a pilot pressure delivered to a pilot pressure port of the body against the force of the biasing means to a position in die passage in which the piston engages the valve member and restrains the valve member against movement off the valve seat in response to the inlet pressure.

Means may be provided to permit fluid pressure at the outlet to be communicated to an intermediate region of the passage between the valve member and the piston at least when the piston is engaged with the stop. For example the outlet may open into the valve passage and there may be a flow path for the fluid at the outlet past and/or through the valve member to the intermediate region when the valve member is in engagement with the valve seat.

BRIEF DESCRIPTIONS OF THE DRAWINGS

Such a valve in accordance with the third aspect of the invention may be a check valve to permit the flow of exhausted fluid from at least one of the first and second sides of the movable member of the actuator of the hydraulic system according to the first aspect of the invention to augment the supplied fluid from the selector valve means and thus be directed with the supplied fluid, to the second or first side respectively of the movable members.

The invention will now be described with reference to the accompanying drawings in which.

DETAILED DESCRIPTION OF THE INVENTION

Figure 1:
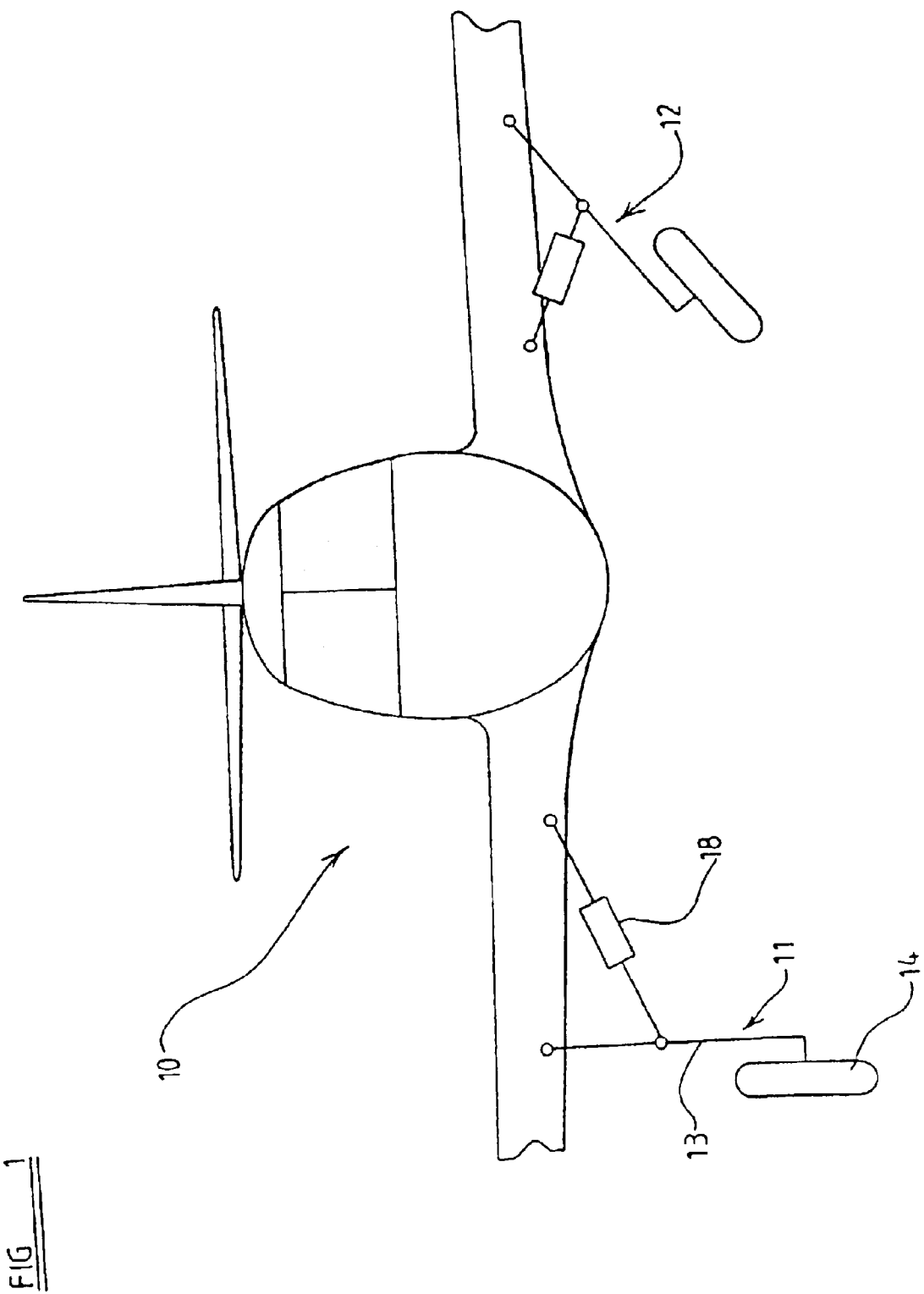
FIG. 1 is a front illustrative view of an aircraft showing the landing gear thereof on one side in a lowered lauding condition and the landing gear at the other side partly raised towards a stowed condition, tile landing gear being operated by a hydraulic system in accordance with the invention.

Referring first to FIG. 1 of the drawings an aircraft 10 has landing gear 11, 12 one at each side thereof, the landing gears 11, 12 each including a strut assembly 13 which carries a landing wheel 14, which strut assembly 13 is movable between a generally vertical lowered condition for landing, and a raised stowed condition in which the strut assembly 13 is generally horizontal and located within a wing :15 where the landing gear 11, 12 is stowed.

The landing gears 11, 12 are operable by means actuators 18 which are extendible and retractable by means of pressurized hydraulic fluid.

Figure 2:
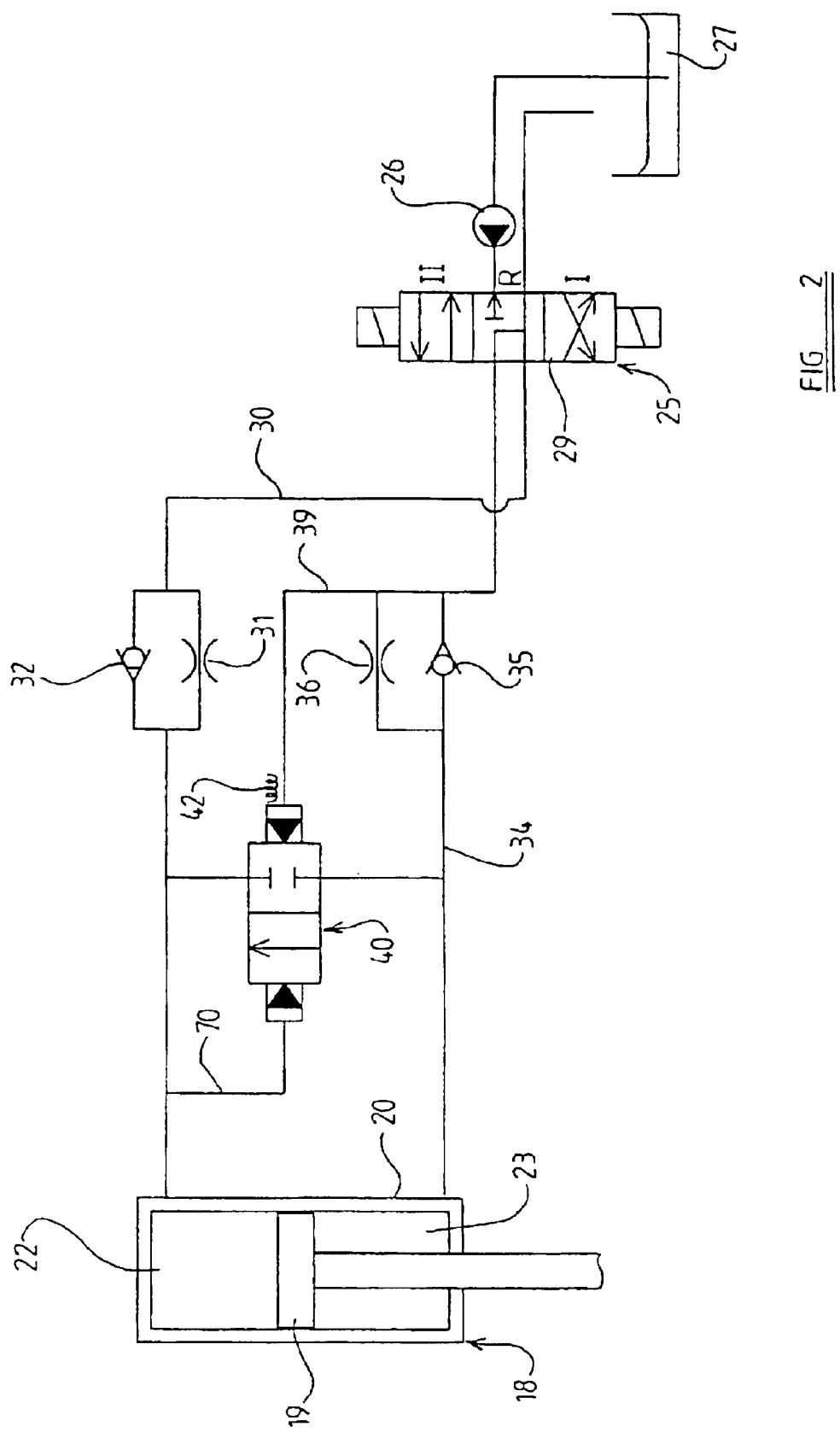
FIG. 2 is an illustrative view of a hydraulic system in accordance with the invention.

Referring now to FIG. 2, a hydraulic system is shown. It can be seen that in this example each actuator 18 has a movable member or piston 19 in this example, which moves inside a casing or cylinder 20, as is well known in the art of hydraulic systems.

When pressurized hydraulic fluid is supplied to a head end 11 of the actuator 18 at a first side of the piston 19, the piston 19 moves in the cylinder 20 so as to extend the actuator 18, at the same time forcing fluid at a second opposite side of the piston 19, to be exhausted from an actuator rod end 23 of the actuator 18. Conversely, when pressurized fluid is supplied to the actuator rod end 23 of the actuator 18, the piston 19 moves in the cylinder 20 so as to retract the actuator 18, at the same time forcing fluid to be exhausted from the head end 22.

Hydraulic fluid is fed to the actuator 18 via a selector valve means 25 to which a source of fluid under pressure i.e. a hydraulic pump 26 is connected. The pump 26 draws hydraulic fluid for pumping, from a tank 27.

The selector valve means 25 is movable between three positions in this example. When in a first raised position, i.e. when a spool 29 thereof is in the position indicated in the drawings at I, pressurized fluid is supplied to a first supply line 30 which extends to the head end 22 of the actuator 18. In the first supply line 30 there is a flow regulating means 31 which controls the pressure of fluid which is supplied to the head end 22 of the actuator 18. Also there is a by-pass one way valve 32 which enables fluid from the first supply line 30 to flow freely to tank 27 as hereinafter described.

When the spool 29 of the selector valve means 25 is in an intermediate or rest position as shown and indicated at R, the pressurized fluid source i.e. pump 26 is isolated from the actuator 18 and moreover fluid may flow from the first supply line 30 as well as from a second supply line 34 to be described, back to tank.

When the spool 29 of the selector valve means 25 is in a second lowered position as indicated at II in FIG. 2, pressurized fluid is fed from the pump 26 to a second supply 34 which extends to the rod end 23 of the actuator 18. The second supply line 34 includes a one way valve 35 through which pressurized fluid may freely flow to the rod end 23 of the actuator 18, and a by-pass restrictor 36 which allows fluid to by-pass the one way vale 35 as hereinafter described.

Between the first 30 aid sec id 34 supply lines, there is a check valve 40. In FIG. 2 the operation of the check valve 40 is shown illustratively, and the operation of a practical such check valve 40 will be described below with reference to FIG. 3.

The operation of the hydraulic system described will now be outlined.

Starting with the actuator 18 in a retracted position in which the landing gear 11 or 12 is stowed, when it is desired to lower the landing gear for landing, the selector valve means 25 is moved to the first position 1.

Fluid thus flows along the first supply line 30, through the flow regulating means 31 to the head end 22 of the actuator 18 and the piston 19 is caused to commence movement to extend the actuator 18 to lower the landing gear 11 or 12. Fluid flow from the rod end 23 of the actuator 18 is however restricted to a small flow through the by-pass restrictor 36 from where the exhausted fluid passes to tang 27 via the selector valve means 25.

Because exhausted fluid flow is thus restricted, pressure will build up in both the first and second 30,34 lines. This pressure build up results in the check valve 40 being opened, as more particularly described below with reference to FIG. 3, thus to permit exhausted fluid from the rod end 23 of the actuator 18 to flow into the first supply line 30 to augment the supply of fluid from the selector valve means 25, resulting in less fluid being demanded from the pump 26.

Thus piston 19 movement in the cylinder 20 may continue fully to lower the landing gear 11 or 12.

The presence of the by-pass restrictor 36 in the line 34 between the rod end 23 and the selector valve means 25 allows fluid flow from the line 34 when the check valve 40 is closed so that there is no risk of residual uncirculated fluid preventing the piston 19 from moving through its full range.

Typically, a mechanical or other sensing arrangement is provided which may interface with an interlock which operates mechanically to retain the landing gear in its fully lowered condition and may cause the selector valve means 25 to assume the rest position R once the landing gear 11 or 12 is fully lowered. In the rest condition R, fluid may flow from the first and second supply lines 30, 34 to tank 27 so that the system is unpressurized when the landing gear 11 or 12 is in a fully lowered condition and the pump 26 is indicated.

When the selector valve means 25 is moved to the rest position R, the check valve 40 will be closed by the action of a rerun spring 42 or the like.

When it is desired to raise the landing gear 11 or 12 the selector valve means 25 may be moved to the second position II in which pressurized fluid is fed to the second supply line 34 through the one way valve 35 to the rod end 23 of the actuator 28, and the piston 19 will be moved to begin retraction of the landing gear 11 or 12. When there is an interlock mechanically to retain the landing gear in a lowered condition, this needs to be released before the piston 19 can move. Such release may be arranged to occur simultaneously with selector valve means 25 movement.

Fluid which is exhausted from the head end 22 of the actuator 18 may flow freely past the one way valve 32 in the first line 30, to tank 27 via the selector valve means 25. The check valve 40 will remain closed when the selector valve means 25 is in the second condition and there is no exchange of fluid between the two lines 30 and 34. However, when fluid is supplied to the second supply line 34, a portion of (lie fluid is bled to a pilot line 39 which flows to the check valve 40 and operates to maintain the check valve 40 in the closed condition.

As the landing gear 11 or 12 fully retracts, an uplock may be operated mechanically to hold the landing gear in its raised condition. At the same time, the selector valve means 25 may be moved to the rest position R so that again, the hydraulic system is unpressurized when the landing gear 11 or 12 is in its stowed condition.

Figure 3:
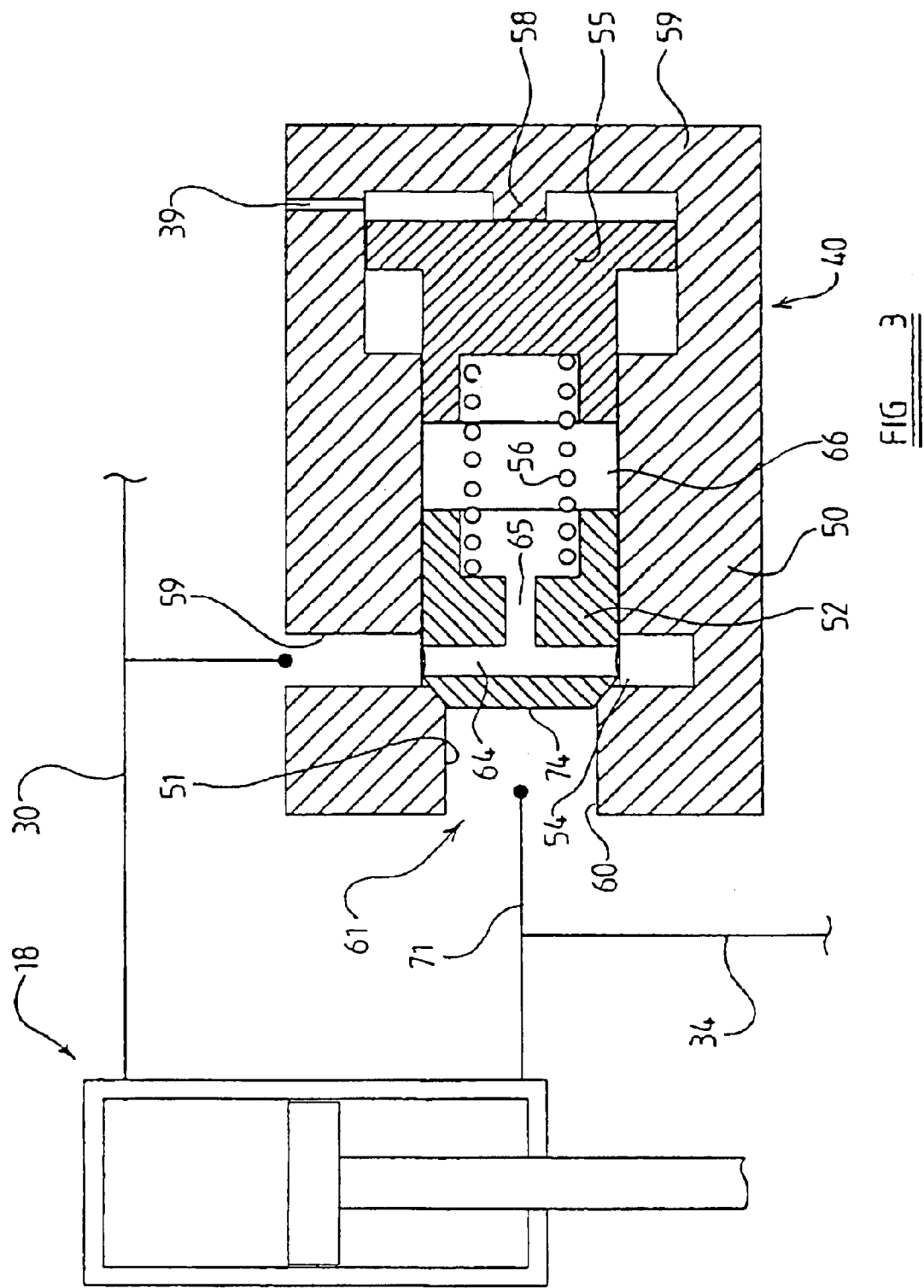
FIG. 3 is a more detailed but illustrative view of a check valve for use in the system of FIG. 2.

Referring now to FIG. 3 particular example of a check valve 40 is illustrated.

The check valve 40 has a valve body 50 in which there is provided a valve passage 51. The passage 51 contains a valve member 52 which is movable in the passage 51 into and away from engagement with a valve seat 54, towards one end 60 of the passage, and a valve piston 55. The valve piston 55 has a larger cross sectional area than the valve member 52, and accordingly the passage 51 is stepped. The valve piston 55 is in sealing engagement with the passage 51.

Between the valve member 52 and the valve piston 55 there is provided a resilient biasing means which in this example is a coil spring 56 which urges the valve member 52 into engagement with its seat 54, and the valve piston 55 into engagement with a stop 58 at one closed end 59 of the passage 51.

At the opposite end 60 of the passage 51 to the closed end 59, there is a fluid inlet 61, arranged such that fluid pressure at the inlet 61 acts to lift the valve member 52 from the seat 54 when sufficient to overcome the force of the coil spring 56. A fluid outlet 59 intersects with the passage 51 and is positioned such that as the valve member 52 is lifted off its seat 54, fluid flow from the inlet 61 to the outlet 59 is permitted. Moreover, the valve member 52 has a circumferential recess 64 which is aligned with the outlet when the valve member 52 is on its seat 54. The recess 64 opens to an axially extending channel 65 along the valve member 52 so that fluid pressure at the outlet 59 is communicated to an intermediate region 66 between the valve member 52 and the valve piston 55. The valve member 52 and the valve piston 55 are each cut away to provide a location for the coil spring 56 and to enhance the volume of the intermediate region 66. Thus when the valve member 52 is on its seat 54, outlet fluid pressure assists the spring 56 in urging tile valve member 52 and pistol 55 apart.

In FIG. 3, the connections to the hydraulic system of FIG. 2 are intimated. In FIG. 2, there is shown line 70 from the first supply line 30 to the check valve 40 to intimate that the check valve 40 responds to sufficient fluid pressure in the first supply line 30. In FIG. 3 though there is intimated a line 71 from the second supply line 34 to the check valve 40. In both cases because there is a pressure rise as the landing gear 11 or 12 is lowered because fluid cannot freely flow from the rod end 23 of the actuator 18, the check valve 40 will be opened.

Referring again to FIG. 3, when such pressure rise is experienced in the second supply line 34 and line 71, this will be communicated to the face 74 of the valve member 52 and will lift the valve member 52 off the seat 54. Thus during lowering of die landing gear 11 or 12, fluid may flow past the valve member 52 from the second line 34 into the first supply line 30 to augment the supplied fluid.

When fluid is supplied under pressure to the second supply line 34 to raise the landing gear 11 or 12, a pilot pressure is delivered to the check valve along line 39 and acts to urge the valve piston 55 away from its stop 58 and against the force of the coil spring 56 until the valve piston 55 engages the valve member 52 to urge the valve member 52 firmly onto the seat 54, notwithstanding high supply fluid pressures exerted on the face 74 of the valve member 52, because the valve piston 55 are of on which the pilot pressure acts, is greater than that of the valve member 52.

Various modifications may be made without departing from the scope of the invention.

Particularly, the check valve 40 described with reference to FIG. 3 is only an example of a check valve suitable for the purpose of allowing fluid expelled from the actuator 18 to augment the flow of fluid to the actuator.

The various components of the hydraulic system have been described as separate components although it will be appreciated that multiple components may be provided e.g. in a common valve block. Thus the one way valves 32, 35 and/or the restrictor means 36 and/or the floss control means 31 may be provided in a common valve block together or not with the check valve 40 and possibly the selector valve means 25 too.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination be utilized for realizing the invention in diverse forms thereof.

What is claimed is:

1. A hydraulic system for raising and lowering aircraft landing gear, the system including an actuator which is extendible and retractable to operate the landing gear, the actuator including a movable member in a casing, the movable member being moved relative to the casing in a first direction to extend the actuator when fluid under pressure is supplied to a first side of the movable member while fluid is exhausted from a second side of the movable member, and the movable member being moved in a second direction to retract the actuator when fluid under pressure is supplied to the second side of the movable member while fluid is exhausted from the first side of the movable member, and there being a selector valve selectively to supply pressurized fluid to the first or second side of the movable member, and wherein a valve is provided to permit exhausted fluid from at least one of the first and second sides of the movable member to augment the supplied fluid from the selector valve and thus be directed with the supplied fluid, to the second or first side respectively of the movable member; and wherein a relief device is provided to relieve exhausted fluid which is not recirculated from the at least one of the first and second sides of the movable member as the movable member reaches the end of travel in the casing.

2. A hydraulic system for raising and lowering aircraft landing gear, the system including an actuator which is extendible and retractable to operate the landing gear, the actuator including a movable member in a casing, the movable member being moved relative to the casing in a first direction to extend the actuator when fluid under pressure is supplied to a first side of the movable member while fluid is exhausted from a second side of the movable member, and the movable member being moved in a second direction to retract the actuator when fluid under pressure is supplied to the second side of the movable member while fluid is exhausted from the first side of the movable member, and there being a selector valve selectively to supply pressurized fluid to the first or second side of the movable member, and wherein a valve is provided to permit exhausted fluid from at least one of the first and second sides of the movable member to augment the supplied fluid from the selector valve and thus be directed with the supplied fluid, to the second or first side respectively of the movable member;
   a first fluid supply line to the first side of the movable member for supplied fluid from the selector valve when the selector valve is in a first position, and a second supply line to the second side of the movable member for supplied fluid from the selector valve when the selector valve is in a second position, and the valve which permits exhausted fluid from at least one of the first and second sides of the movable member to augment the supplied, fluid from the selector valve and thus be directed with the supplied fluid, to the second or first side respectively of the movable member, permitting the exhausted fluid to flow from the second supply line to the first supply line; and
   wherein the second supply line includes a non return valve at least to restrict the flow of exhausted fluid from the hydraulic system.

3. A system according to claim 2 wherein a restrictor device is provided to enable a restricted flow of exhausted fluid which is not recirculated to by-pass the non-return valve.

4. An aircraft having landing gear which is raised and lowered by a hydraulic system including an actuator which is extendible and retractable to operate the landing gear, the actuator including a movable member in a casing, the movable member being moved relative to the casing in a first direction to extend the actuator when fluid under pressure is supplied to a first side of the movable member while fluid is exhausted from a second side of the movable member, and the movable member being moved in a second direction to retract the actuator when fluid under pressure is supplied to the second side of the movable member while fluid is exhausted from the first side of the movable member, and there being a selector valve selectively to supply pressurized fluid to the first or second side of the movable member, and wherein a valve is provided to permit exhausted fluid from at least one of the first and second sides of the movable member to augment the supplied fluid from the selector valve and thus be directed with the supplied fluid, to the second or first side respectively of the movable member, the valve including a valve member and a piston disposed in a passage and biased in opposite directions by only a single spring such that the valve member is urged towards a valve seat and the piston is urged toward a stop, the valve member arranged to move off the valve seat in response fluid pressure increases at an inlet in a valve body, the piston movable away from the stop in response to a pilot pressure delivered to a pilot pressure port of the valve body to a position in the passage in which the piston engages the valve member and restrains the valve member against movement off the valve seat in response to the inlet pressure.

5. A valve including a valve member and a piston each received in a passage in a valve body, the valve member and piston being biased apart by a spring such that the valve member is urged towards a valve seat towards one end of the passage, and the piston is urged towards a stop towards an opposite end of the passage, a fluid inlet and a fluid outlet, the pressure of fluid at the inlet when sufficient, acting to move the valve member against the force of a spring off the valve seat to permit fluid flow from the inlet, past the valve seat, to the outlet, and the piston being movable in the passage away from the stop in response to a pilot pressure delivered to a pilot pressure port of the body against the force of the spring to a position in the passage in which the piston engages the valve member and restrains the valve member against movement off the valve seat in response to the inlet pressure.

6. A valve according to claim 5 wherein a channel is provided to permit fluid pressure at the outlet to be communicated to an intermediate region of the passage between the valve member and the piston at least when the piston is engaged with the stop.

7. A valve according to claim 6 wherein the outlet opens into the valve passage and there is a flow path for the fluid under pressure at the outlet past or through the valve member to the intermediate region when the valve member is in engagement with the valve seat.

8. A valve according to claim 5 wherein the valve is a check valve to permit the flow of exhausted fluid from at least one of the first and second sides of a movable member of an actuator of a hydraulic system which includes an actuator which is extendible and retractable to operate landing gear of an aircraft, the actuator including a casing, the movable member being moved relative to the casing in a first direction to extend the actuator when fluid under pressure is supplied to a first side of the movable member while fluid is exhausted from a second side of the movable member, and the movable member being moved in a second direction to retract the actuator when fluid under pressure is supplied to the second side of the movable member while fluid is exhausted from the first side of the movable member, and there being a selector valve selectively to supply pressurized fluid to the first or second side of the movable member, and wherein a valve is provided to permit exhausted fluid from at least one of the first and second sides of the movable member to augment the supplied fluid from the selector valve and thus be directed with the supplied fluid, to the second or first side respectively of the movable member to augment the supplied fluid from the selector valve and thus be directed with the supplied fluid, to the second or first side respectively of the movable member.

9. A hydraulic system for raising and lowering aircraft landing gear, the system including:
   a valve member and a piston each received in a passage in a valve body;
   a spring disposed to bias the valve member and the piston apart such that the valve member is urged towards a valve seat disposed adjacent a first end of the passage and the piston is urged toward a stop disposed adjacent a second end of the passage,
   a fluid inlet and a fluid outlet, the valve member arranged to move off the valve seat in response to sufficient fluid pressure at the inlet to permit fluid flow from the inlet, past the valve seat, to the outlet, the piston movable against the force of the spring away from the stop in response to a pilot pressure delivered to a pilot pressure port of the valve body to a position in the passage in which the piston engages the valve member and restrains the valve member against movement off the valve seat in response to the inlet pressure;

an actuator, the actuator extendable and retractable to operate the landing gear, the actuator including a movable member disposed in a casing, the movable member being movable relative to the casing in a first direction to extend the actuator when pressurized fluid is supplied to a first side of the movable member and exhausted from a second side of the movable member, the movable member movable in a second direction to retract the actuator when pressurized fluid is supplied to the second side of the movable member and exhausted from the first side of the movable member, a selector valve arranged to supply pressurized fluid to a selected one of the first side and the second side of the movable member, a check valve arranged to permit exhausted fluid from at least one of the first and second sides of the movable member to augment the fluid supplied from the selector valve and thus be directed with the supplied fluid, to the second or first side, respectively, of the movable member.

10. The system according to claim 9, wherein the check valve is arranged to open in response to movement of the movable member in a first direction extending the actuator to thereby lower the landing gear in response to providing pressurized fluid to the first side of the movable member or in response to pressure buildup in a fluid exhaust passage in flow communication with the second side of the movable member.

11. The system according to claim 10, including closure means for closing the check valve in response to providing pressurized fluid to the second side of the movable member.

12. The system according to claim 9, including a relief valve arranged to relieve non-recirculated exhausted fluid from at least one of the first and second sides of the movable member as the movable member approaches an end of the casing.

13. The system according to claim 9, including a first fluid supply line in flow communication with the first side of the movable member and arranged to supply fluid from the selector valve when the selector valve is in a first position, and a second supply line in flow communication with the second side of the movable member and arranged to supply fluid from the selector valve when the selector valve is in a second position, and wherein the valve cooperates with the selector valve to permit fluid supplied by the selector valve to be directed with fluid exhausted from the first or second side of the movable member from the second supply line to the first supply line.

14. The system according to claim 13, wherein the second supply line includes a one-way check valve arranged to restrict the flow of exhausted fluid from the hydraulic system, and a restrictor arranged to enable a restricted flow of fluid that is not recirculated to by-pass the one-way check valve.

15. The system according to claim 13, wherein the selector valve is movable to a first position to permit fluid flow to the first side of the movable member, the selector valve further movable to a second put position to permit fluid flow to the second side of the movable member, the selector valve further movable to a rest position in which fluid from a source is isolated and flows from the system to a tank.

* * * * *